United States Patent Office 3,512,769
Patented May 19, 1970

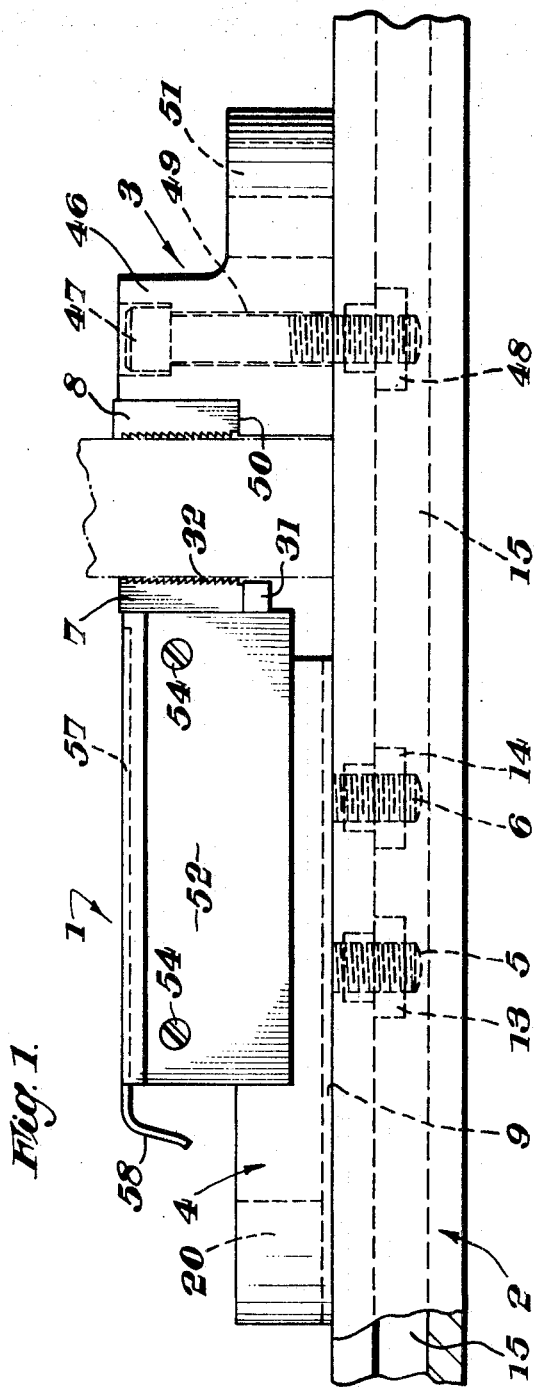

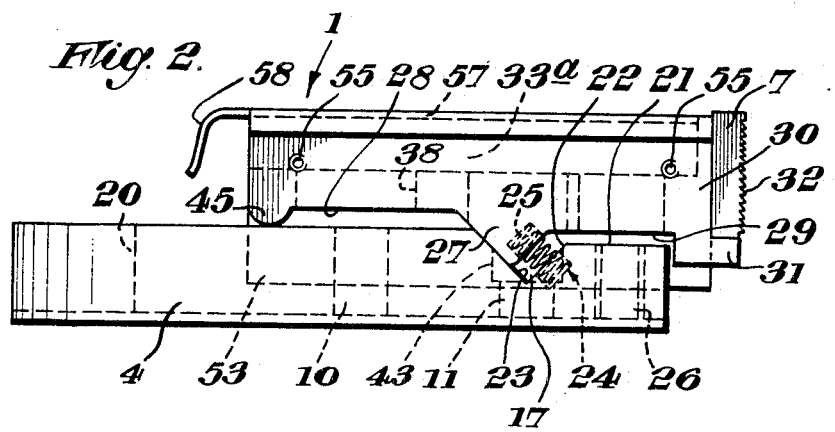
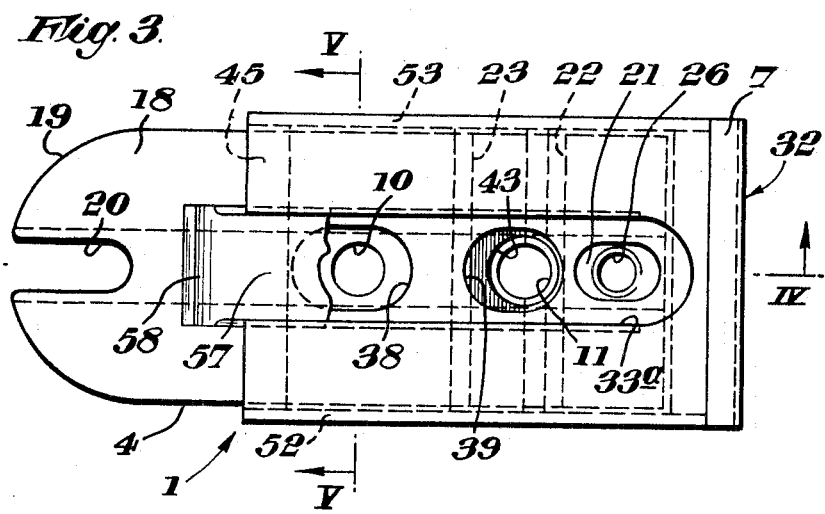

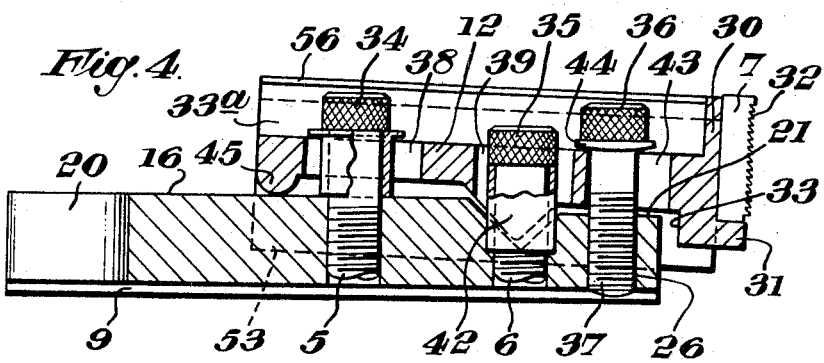
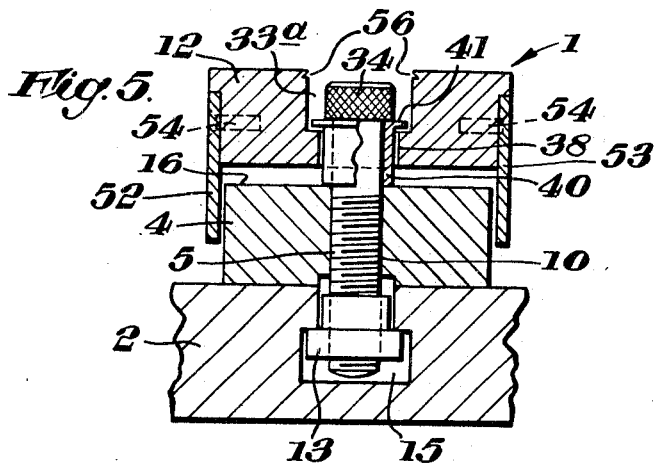
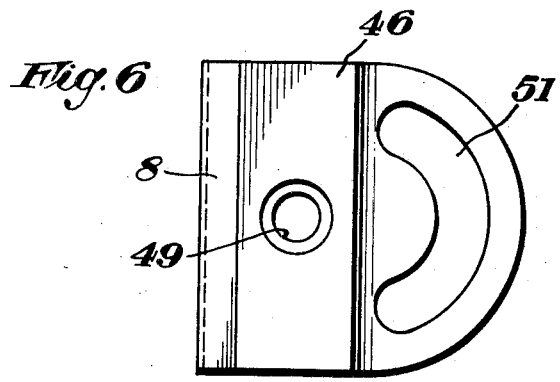

3,512,769
MACHINE TOOL WORK HOLDERS
Harold George Pendry and Peter Gerald Pendry, both of Thorpe Industrial Estate, Crabtree Road, 10 Acre Lane, Thorpe, Egham, Surrey, England
Filed Feb. 8, 1968, Ser. No. 704,109
Claims priority, application, Great Britain, May 18, 1967, 23,063/67
Int. Cl. B23q 3/02
U.S. Cl. 269—94     3 Claims

ABSTRACT OF THE DISCLOSURE

This invention relates to a work holder which carries at a forward end a workpiece engaging face and which is releasably securable to a bed and is adjustable towards and away from a fixed abutment on the bed to grip a workpiece between the face and the abutment. In accordance with the invention the work holder comprises a base part for mounting on the bed and said face is on a clamping jaw mounted on the base part, the clamping jaw being adapted to rock relatively to the base part about a fulcrum and, by the engagement of complemental inclined surfaces on the clamping jaw and base part, to move forwardly on the base part when the rocking moves the said face towards the bed, whereby said face will simultaneously press a workpiece towards the bed and against the fixed abutment.

---

This invention relates to work holders for use on beds provided on engineers' and similar benches, or on milling machines and other machine tools. Such work holders usually comprise a clamping head coarsely adjustable to and from an abutment member already established or secured in a fixed position on the bed, said clamping head having a base part and means for locking the base part on the bed in a suitable position in relation to the abutment member whereby a clamping jaw on the base part of the head can be finely adjusted to clamp the workpiece.

The present invention provides such a work holder for gripping a workpiece by forcing the workpiece against a fixed abutment member, in which the work holder comprises a base part which is securable on a bed at an adjustable distance from the fixed abutment, and a clamping jaw movable on the base part and having at one end a work-gripping face and which is mounted so as to be capable of slight rocking on the base part about a transverse fulcrum heel situated remote from said work-gripping face on the clamping jaw, said base part and said jaw having, intermediately of said fulcrum and said work-gripping face, complemental inclined faces which, by moving the jaw toward the base part, co-operate to cause the jaw to move forward, as it rocks, into gripping contact with the workpiece. By this means the jaw not only advances horizontally to grip the workpiece, but exerts a downward pressure on the face of the workpiece, keeping the latter firmly on the bed.

A work holder embodying the invention will now be described, by way of example, with reference to the accompanying drawings, wherein:

FIG. 1 is a side elevation of the work holder in combination with an abutment member as mounted on a bed;

FIG. 2 is a side elevation of the same work holder with a side cover plate removed;

FIG. 3 is a plan of the arrangement shown in FIG. 2;

FIG. 4 is a sectional view on the line IV—IV in FIG. 3;

FIG. 5 is a sectional view, on the line V—V in FIG. 3, of the work holder as mounted on the bed; and FIG. 6 is a plan of the abutment member.

Referring to FIG. 1, the work holder comprises a clamping head 1 which is coarsely adjustable on a bed 2 towards and away from an abutment member 3 which is secured on the bed 2. The clamping head 1 includes a base part 4 and locking bolts 5, 6 for locking the base 4 on the bed 2 in any required position relative to the abutment member 3, with a first clamping jaw 7 of the clamping head 1 co-operating with a second clamping jaw 8 on the abutment member 3 to grip a workpiece between the jaws.

The base part 4 is a block of substantially oblong form with a flat bottom surface to seat on the bed 2, and conveniently there is provided in the bottom surface, and symmetrical with the longitudinal axis of the base part 4, a slot 9 to co-operate with a complementary tenon (not shown) upstanding from the bed 2. Two plain unthreaded round holes 10, 11, on the longitudinal axis of the base part 4 and extending vertically therethrough, are adapted to receive the locking bolts 5, 6 respectively which are a sliding fit in the holes and extend downwardly through a jaw holder 12 positioned on the base part 4. At their lower ends the bolts 5, 6 are engaged by T-section nuts 13, 14 which act as sliders in a complemental longitudinal slot 15 in the bed 2. The arrangement is such that the T-section nuts 13, 14, as sliders, can be clamped in the slot 15 when the clamping head 1 has been moved to a requisite position on the bed 2.

The upper face 16 of the base part 4 is flat and has near its forward end, that is the end adjacent the first clamping jaw 7, a transverse V-groove 17, and the second mentioned plain hole 11 is located centrally of the groove 17. The other end 18 of the base part 4 is rounded off so that, at this end, the flat upper surface 16 finishes as a semi-circular edge 19 to which opens a slot 20 extending through the thickness of the base part 4 and symmetrical with its axis, the slot 20 extending a short distance inwards from the edge 19 and having a width similar to the aforementioned holes 10, 11.

At the forward end of the base part 4 there is a down step 21 from its flat upper surface 16, and the V-groove 17 is formed partly in the step 21 and partly in the upper surface 16 so that one sloping side 22, towards the forward end of the base part 4, is shorter than the rearmost sloping side 23. The shorter side 22 has two or more circular recesses, of which one (24) is indicated in FIG. 2, drilled into it, with their axes normal to the side 22; in each recess 24 is accommodated a compression spring 25 which extends into the V-groove 17. The step 21 has a threaded hole 26 on the centre line of the base part 4.

The jaw holder 12 is a solid block mounted on top of, and generally corresponding to the oblong shape of, the base part 4. The under surface of the jaw holder 12 has a transverse V-section rib 27 which is complemental to the V-slot 17 of the base part 4. The under surface of the jaw holder has a rear part 28 and a forward part 29 at different levels in general correspondence with the different levels of the top surface 16 of the base part 4 which result from the step 21. The V-section rib 27 is formed at the junction of the surface parts 28, 29 so that the forward side of the rib 27 is shorter than its rear side. In the forward side of the rib 27 are recesses to receive and locate the outer ends of the springs 25. The forward end 30 of the jaw holder 12 is squared off and is conveniently formed with a lower forwardly extending lip 31, and the first clamping jaw 7 is a block fitted on the squared off face and supported on the lip 31. The front, or gripping, face 32 of the jaw 7 is serrated. The forward end 30 of the jaw holder 12 is also formed with a lower inverted step 33 which lies over the stepped down forward end 21 of the base part 4.

From a position near the front seating for the jaw 7, the top of the jaw holder 12 has a central open recess 33a, extending to its rear end, to house the heads 34, 35 of the bolts 5, 6 and also the head 36 of a stud 37. The upper parts of the bolts 5, 6 extend freely into the recess 33a through openings 38, 39 in the jaw holder 12, the openings being elongated in the longitudinal direction of the jaw holder 12 to permit it to move to a limited extent longitudinally on the base part 4. The heads of the bolts and stud are round and recessed for engagement by a noncircular section key.

The width of the opening 38 is less than that of the recess 33a in the jaw holder 12 and greater than the diameter of the plain hole 10 in the base part 4. Within the opening 38, the bolt 5 is surrounded by a cylindrical bush 40 engaging at its lower edge of the surface 16 of the base part 4 and having at its upper edge a radial flange 41 adapted to engage the bottom of the recess 33a at each side of the opening 38. Thus by screwing the bolt 5 into its T-shape nut 13 the jaw holder and the base part 4 can be clamped together and to the bed 2. At its upper end the plain hole 11 is enlarged to receive a cylindrical bush 42 under the bolt head 36, so that by screwing the bolt 6 into its T-shape nut 14 the bush 42 is forced against the bottom of the enlargement of the hole 11 to also clamp the base part 4 on the bed 2. The stud 37 extends through an enlarged hole 43, in the forward end of the jaw holder 12, from the bottom of the recess 33a into threaded engagement with a tapped hole 26 in the base part 4. The hole 43 is narrower than the recess 33a, and beneath the head 36 of the stud 37 there is provided a washer 44 of which the underside is curved, e.g. spheroidal, and engages the bottom of the recess 33a at the boundary of the hole 26. By tightening the stud 37 the forward end of the jaw holder 12 can be clamped to the base part 4.

On the under surface of the jaw holder 12 and at the extreme rearmost end thereof, i.e. rearward of the elongated opening 38, there is a transverse heel 45 which is a rib of uniform dimension, of arcuate shape section, extending completely from side to side of the jaw holder 12 and resting on the top surface 16 of the base part 4, so that adjacent to the heel 45 of the under surface of the jaw holder 12 is raised above the top surface of the base part 4. The heel 45 can slide on the top surface 16 and there is, as indicated, provision for the jaw holder 12 to tilt about the line of contact between the heel 45 and the surface 16.

The abutment member 3 may be any convenient form; as shown it comprises a block 46 with a flat under face adapted to seat on the bed 2 and adapted to be clamped thereto by means of two bolts of which one (47) extends through a plain hole 49 and is engaged by a T-shape nut 48 in the aforementioned slot 15 in the bed 2. On a vertical face of the block 46 there is a stepped seating 50 for the second jaw 8 which is generally similar to the first jaw 7. The block 46 has also an arcuate slot 51 (FIG. 6) to receive a second bolt, similar to the last mentioned (47), for engaging the bed 2; the slot 51 is concentric with the axis of the bolt hole 49, so that the abutment member 3 is angularly adjustable on the bed 2 and can be clamped to the bed in any angular setting within the range of the curved slot 51.

A workpiece standing on the bed 2 is caused to be gripped between the jaws 7, 8 by the following sequence of operations.

The abutment member 3 is first clamped in the required position on the bed 2 with the workpiece against the second jaw 8. The clamping head is released from the bed 2 by slackening the bolts 5, 6 and the stud 37 is also released to allow the jaw holder 12 to be urged rearwardly and to be tilted back about the heel 45 by the pressure of the springs 25 so that the face 32 of the first jaw 7 is tilted backwards, away from the second jaw 8, at a small angle, for instance 2½ degrees to the vertical. The clamping head 1 is now moved forward until the first jaw 7 engages the workpiece and the head 1 is then secured on the bed 2 by means of the bolts 5, 6. Now the stud 37 is tightened, by screwing it into the base part 4, with two effects occurring simultaneously. On the one hand the stud 37 forces the front of the jaw holder 12 downwards, so that it turns about the line of contact of the heel 45; thus the face 32 of the first jaw 7 is first turned towards the vertical and thereafter becomes, or tends to become, inclined in the oppostie sense. At the same time, on the other hand, the rear inclined face of the V-rib 27 slides downwards on the rear face 23 of the V-groove, so that the whole of the jaw holder 12 moves forward on the base part 4. Thus the workpiece will become firmly gripped between the jaws 7, 8, and the downward pressure exerted on the jaw 7 will cause the workpiece to be held firmly against the bed 2.

Two side cover plates 52, 53 are releasably attached to the sides of the jaw holder 12 by means of screws 54 extending through the plates into tapped holes 55, shown in the arrangement of FIG. 2 from which the plate 52 has been removed.

The plates 52, 53 extend downwards to overlap the sides of the base part 4. Towards the top of each side of the recess 33a in the jaw holder 12 there is formed an undercut groove 56. A top cover plate 57, having a downward turned rear end 58, can slide into the grooves 56, 56 to form a top closure for the recess 33a. The purpose of the side and top cover plates 52, 53, 57 and the downward turned rear end 58 of the top plate 57 is to prevent entry of swarf to the interior of the device.

We claim:
1. An improved work holder for mounting on a flat bed and adjustable thereon towards and away from an abutment secured to the bed, the work holder having at a forward end a workpiece engaging face and being releasably securable to the bed to grip a workpiece between said face and said abutment, the improvement comprising the provision of the work holder as two parts of which the first part is a base part which is adjustable forwardly and rearwardly on the bed and is engaged by releasable securing means to releasably clamp the base part to the bed, and the second part is a clamping jaw carrying said face at a forward end and being adjustable forwardly and rearwardly on the base part, a fulcrum heel on one of the two parts in engagement with a flat surface on the other part and extending transversely to the direction of adjustment of the parts relatively to the bed, whereby the clamping jaw can rock on the base part in the sense to move said forward end of the clamping jaw towards and away from the bed, clamping means interconnecting the clamping jaw and base part for exerting pressure in the sense to move said forward end of the clamping jaw towards the bed, resilient biassing means positioned between the two parts to exert pressure in the sense to move said forward end of the clamping jaw away from the bed, and, on the clamping jaw and base part between the fulcrum heel and said forward end of the clamping jaw, mutually engaging complemental surfaces extending transversely to said direction of adjustment and inclined forwardly and downwardly towards the bed, whereby when the clamping jaw rocks to move the forward end thereof towards the bed the clamping jaw will tend to be moved forwardly on the base member as one of said complemental surfaces moves over the other thereof.

2. A work holder as claimed in claim 1, wherein the fulcrum heel is part of the clamping jaw and is a uniform section rib having an arcuate section profile in engagement with the base part, the complemental surfaces are two mutually engaging sides of a V-section rib on the clamping jaw and a V-section groove in the base part, and
the resilient biassing means is positioned between the othe rsides of the V-section rib and groove.

3. A work holder as claimed in claim 1, wherein said clamping means is a stud extending through an opening in the clamping jaw into screw-thread engagement with the base part,
said releasable securing means are clamping bolts extending as a close sliding fit through plain round openings in the base part and through further openings in the clamping jaw, and
said opening and further openings are elongated in said direction of adjustment.

References Cited

UNITED STATES PATENTS

| | | | |
|---|---|---|---|
| 2,564,138 | 8/1951 | Walker | 269—138 |
| 3,090,612 | 5/1963 | Rouse | 269—137 XR |

FOREIGN PATENTS 21,470  10/1904  Great Britain.

LESTER M. SWINGLE, Primary Examiner

D. D. EVENSON, Assistant Examiner

U.S. Cl. X.R.

269—135, 138